US008184716B2

(12) United States Patent
Kodama et al.

(10) Patent No.: US 8,184,716 B2
(45) Date of Patent: *May 22, 2012

(54) IMAGE CODING APPARATUS, IMAGE CODING METHOD AND IMAGE CODING PROGRAM

(75) Inventors: Tomoya Kodama, Kanagawa (JP);
Atsushi Matsumura, Kanagawa (JP);
Noboru Yamaguchi, Saitama (JP);
Tatsuaki Iwata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 902 days.

This patent is subject to a terminal disclaimer.

(21) Appl. No.: 12/234,741

(22) Filed: Sep. 22, 2008

(65) Prior Publication Data

US 2009/0041122 A1    Feb. 12, 2009

Related U.S. Application Data

(63) Continuation of application No. 11/062,625, filed on Feb. 23, 2005, now Pat. No. 7,502,517.

(30) Foreign Application Priority Data

Mar. 29, 2004    (JP) ................................ 2004-096763

(51) Int. Cl.
*H04N 11/02*        (2006.01)
*G06K 9/46*         (2006.01)
(52) U.S. Cl. .................................. 375/240.24; 382/239
(58) Field of Classification Search .............. 375/240.16
See application file for complete search history.

(56) References Cited

U.S. PATENT DOCUMENTS

| 5,506,686 | A  | 4/1996  | Auyeung et al.       |
| 5,850,482 | A  | 12/1998 | Meany et al.         |
| 6,011,868 | A  | 1/2000  | van den Branden et al. |
| 6,026,232 | A  | 2/2000  | Yogeshwar et al.     |
| 6,205,177 | B1 | 3/2001  | Girod et al.         |
| 6,249,318 | B1 | 6/2001  | Girod et al.         |
| 6,356,668 | B1 | 3/2002  | Honsinger et al.     |
| 6,654,417 | B1 | 11/2003 | Hui                  |

(Continued)

FOREIGN PATENT DOCUMENTS

JP    9-55939    2/1997

(Continued)

OTHER PUBLICATIONS

Gary J. Sullivan, et al., "Rate-Distortion Optimization for Video Compression", IEEE Signal Processing Magazine, Nov. 1998, pp. 74-90.

"A Fast Precise Implementation of 8x8 Discrete Cosine Transform Using the Streaming SIMD Extensions and MMX™ Instructions", Intel Application Note AP-922 Streaming SIMD Extensions—A Fast Precise 8x8 DCT, Version 1.0, Apr. 1999, pp. 1-21(with cover pages and table of contents).

*Primary Examiner* — David Czekaj
*Assistant Examiner* — Leron Beck
(74) *Attorney, Agent, or Firm* — Oblon, Spivak, McClelland, Maier & Neustadt, L.L.P.

(57) ABSTRACT

The image coding apparatus is provided to realize image coding with little calculation quantity and through rate distortion optimization thereby maintaining a favorable image quality. The image coding apparatus includes a processing unit that conducts frequency transform and quantization on a block in a predetermined manner for a plurality of coding modes, each mode having a different coding process, a cost calculating unit that calculates a predictive coded quantity and coding distortion in a coding mode using a result of the quantization conducted by the processing unit and a residue to obtain a cost regarding the coding mode, a minimum coding cost selecting unit that selects a minimum coding cost among the coding costs calculated for respective coding modes, and a coding unit that conducts coding on the blocks in a coding mode associated with the minimum coding cost selected by the minimum coding cost selecting unit.

2 Claims, 6 Drawing Sheets

U.S. PATENT DOCUMENTS

| | | |
|---|---|---|
| 6,661,926 B1 | 12/2003 | Thoreau et al. |
| 6,915,018 B2 | 7/2005 | Tajime |
| 6,940,903 B2 | 9/2005 | Zhao et al. |
| 7,194,035 B2 | 3/2007 | Dumitras et al. |
| 2004/0095997 A1 | 5/2004 | Altunbasak et al. |
| 2004/0114817 A1 | 6/2004 | Jayant et al. |
| 2005/0013369 A1* | 1/2005 | Lee .................. 375/240.16 |
| 2006/0193385 A1 | 8/2006 | Yin et al. |
| 2007/0140337 A1 | 6/2007 | Lim et al. |

FOREIGN PATENT DOCUMENTS

| | | |
|---|---|---|
| JP | 9-162746 | 6/1997 |
| JP | 2000-78586 | 3/2000 |
| JP | 2003-230149 | 8/2003 |

* cited by examiner

FIG.2

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

FIG.3

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

IMAGE CODING APPARATUS, IMAGE CODING METHOD AND IMAGE CODING PROGRAM

CROSS-REFERENCE TO RELATED APPLICATIONS

This application is a continuation of U.S. application Ser. No. 11/062,625 filed Feb. 23, 2005 which is based upon and claims the benefit of priority from the prior Japanese Patent Application No. 2004-96763; filed Mar. 29, 2004, the entire contents of which are incorporated herein by reference.

BACKGROUND OF THE INVENTION

1) Field of the Invention

The present invention relates to a technology for performing coding on image data.

2) Description of the Related Art

With the advancement of the Large Scale Integration (LSI) technique and the computer technique, dynamic image coding typified by the Moving Picture Experts Group (MPEG)-2 and MPEG-4 has become increasingly common. With the MPEG-2 being applied to such fields as broadcasting and DVDs (Digital Versatile Discs), while the MPEG-4 being applied to portable telephones, portable video viewers, and the like, the digitization of dynamic images has become an indispensable technique today.

Image coding, such as motion compensation, motion detection, and discrete cosine transform, is a repetitive processing in which an identical process is repeatedly performed on subject image data. For such repetitive processing, the Single Instruction Multiple Data (SIMD) may be favorably employed. The SIMD, which was developed in line with the further sophistication of general purpose processor, advantageously realizes a simultaneous and high-speed processing when an identical process is to be performed on a plurality of data.

It is known to adopt the SIMD for image coding to achieve a high-speed processing (for example, see "A Fast Precise Implementation of 8×8 Discrete Cosine Transform Using the Streaming SIMD Extensions and MMXTM Instructions Version 1.0," April 1999). As is known to those skilled in the art, the SIMD instruction, when employed in a Pentium (registered trademark) 3 processor manufactured by Intel Corporation, enables the completion of discrete cosine transform in fifty cycles in contrast to 970 cycles required in a conventional method which does not use the SIMD.

Meanwhile, it has been studied to achieve dynamic image coding which would allow the generation of high-quality image. A conventionally known such technique is rate distortion optimization which is generally utilized for motion detection and coding mode decision.

The technique of the rate distortion optimization is applied, for example, to motion estimation, scanning in DCT coefficient quantization, determination of quantization step sizes, and intra/inter mode decision (see, for example, Japanese Patent Application Laid-Open Publication No. 2003-230149).

However, in intra/inter mode decision utilizing the rate distortion optimization, for example, the quantity of codes generated through dynamic image coding and coding distortion caused thereby are used for the processing. Hence, in order to make an intra/inter mode decision it may be necessary to actually conduct coding process in each of the intra mode and the inter mode. Since coding process requires a long time, however, there may be a problem that the calculation cost becomes high.

SUMMARY OF THE INVENTION

The present invention has been achieved in order to solve the problems.

An image coding apparatus dividing an image into a plurality of blocks to conduct coding on block basis according to one aspect of the present invention, includes: a processing unit that conducts frequency transform and quantization on the block in a predetermined manner for a plurality of coding modes, each mode having a different coding process; a predictive coded quantity calculating unit that calculates a predictive coded quantity in a coding mode using a result of the quantization conducted by the processing unit; a coding cost calculating unit that calculates a coding cost in each coding mode using the predictive coded quantity calculated by the predictive coded quantity calculating unit; a minimum coding cost selecting unit that selects a minimum coding cost, which is minimum among the coding costs calculated by the coding cost calculating unit, for respective coding modes; and a coding unit that conducts coding on the blocks in a coding mode associated with the minimum coding cost selected by the minimum coding cost selecting unit.

An image coding method of dividing an image into a plurality of blocks to conduct coding on block basis, according to another aspect of the present invention, includes: conducting frequency transform and quantization on the block in a predetermined manner for a plurality of coding modes, each mode having a different coding process; calculating a predictive coded quantity in a coding mode using a result of the quantization obtained; calculating a coding cost in each coding mode using the predictive coded quantity calculated; selecting a minimum coding cost, which is minimum in the coding costs calculated, for respective coding modes; and conducting coding on the blocks in a coding mode associated with the minimum coding cost selected.

A computer program product having a computer readable medium including programmed instructions for dividing an image into a plurality of blocks to conduct coding on block basis according to still another aspect of the present invention, wherein the instructions, when executed by a computer, cause the computer to perform: conducting frequency transform and quantization on the block in a predetermined manner for a plurality of coding modes, each mode having a different coding process; calculating a predictive coded quantity in a coding mode using a result of the quantization obtained; calculating a coding cost in each coding mode using the predictive coded quantity calculated; selecting a minimum coding cost, which is minimum in the coding costs calculated, for respective coding modes; and conducting coding on the blocks in a coding mode associated with the minimum coding cost selected.

BRIEF DESCRIPTION OF THE DRAWINGS

FIG. 2 is a diagram that depicts a quantization matrix used by a quantizer 105 in the intra coding mode;

FIG. 3 is a diagram that depicts a quantization matrix used by a quantizer 105 in the inter coding mode;

DETAILED DESCRIPTIONS

Exemplary embodiments relating to the present invention will be explained in detail below with reference to the accompanying drawings.

Figure 1:
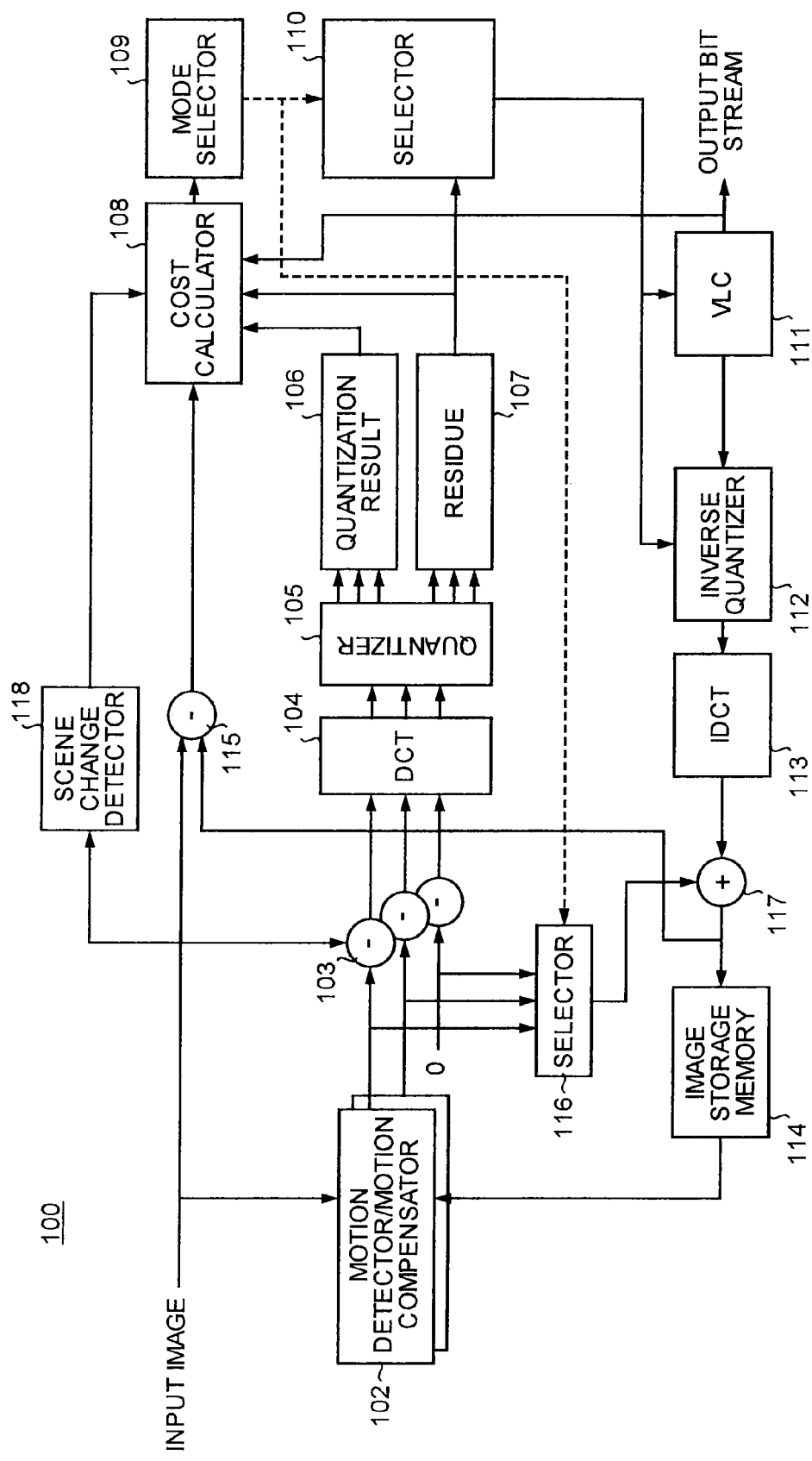
FIG. 1 is a block diagram that depicts a general configuration of an MPEG coding apparatus 100 according to an embodiment of the present invention.

FIG. 1 is a block diagram that depicts a general configuration of an MPEG coding apparatus 100 according to an embodiment. The coding apparatus 100 according to the embodiment conducts coding process based on the ISO/IEC13818-2 (MPEG-2 Video).

The coding processing is not restricted to the ISO/IEC13818-2 (MPEG-2 Video). Other coding process, such as one based on the ISO/IEC14496-2 (MPEG-4 Video) or ISO/IEC14496-10 (MPEG-4 AVC) may be applicable.

The coding apparatus 100 includes a motion detector and motion compensator 102, a subtracter 103, a discrete cosine transformer (DCT) 104, a quantizer 105, a quantization result memory 106, a residue memory 107, a cost calculator 108, a mode selector 109, a selector 110, a variable length coder (VLC) 111, an inverse quantizer 112, an inverse discrete cosine transformer (IDCT) 113, an image storage memory 114, a subtracter 115, a selector 116, an adder 117, and a scene change detector 118.

The cost calculator 108 according to the embodiment serves as a predictive coded quantity calculating unit, a coding cost calculating unit, a predictive coding distortion calculating unit, a prediction expression retaining unit, a prediction expression correcting unit, and an initializing unit recited in the appended claims.

The coding apparatus 100 according to the embodiment conducts coding in a plurality of modes. Here, "a plurality of modes" means that in each mode different type of MPEG coding is performed.

Various types of MPEG coding exist such as, intra coding, forward inter coding, backward inter coding, and bidirectional inter coding. The coding apparatus 100 according to the embodiment operates in three modes: an intra coding mode in which intra coding is conducted; a forward inter coding mode; and a backward inter coding mode. According to the ISO/IEC 13818-2 recommendations, in the inter coding, motion compensation and DCT may be performed on field-basis or frame-basis. For the simplicity of the description, the terms, forward inter coding and backward inter coding here, include both the field-based and the frame-based processings.

As the set mode determines the process to be conducted by respective units in the coding apparatus 100, the coding process can suitably be adjusted for each image.

The motion detector and motion compensator 102 acquires an image from the outside as an input image, to conduct motion detection and motion compensation thereon. In particular, the motion detector and motion compensator 102 conducts forward and backward motion detection and motion compensation, to supply resulting signals of two kinds to the DCT 104.

On receiving the residual signals, which are supplied as a result of the process at the motion detector and motion compensator 102, via the subtracter 103, the DCT 104 conducts frequency transform on the residual signal. The frequency transform conducted by the DCT 104 according to the embodiment is not limited to a discrete cosine transform, and other transforms, which are desirably orthogonal transforms, may suitably be employed. In the intra coding mode, the DCT 104 directly acquires the input image signal to conduct discrete cosine transform on the input image signal.

Thus, image signals (input image signals and residual signals) in all modes are sequentially supplied to the DCT 104. Then, DCT 104 transforms an image signal conveying spatial information into DCT coefficients that is MPEG-encoded frequency information.

An image is divided into 8 by 8 rectangular regions each of which is called block. The DCT 104 conducts the transform on each block to eventually obtain 64 (=8×8) DCT coefficients.

The quantizer 105 quantizes the DCT coefficients obtained by the DCT 104, and stores a result of the quantization in the quantization result memory 106. In addition, the quantizer 105 stores the residue obtained by the quantization computation in the residue memory 107.

The quantizer 105 retains a quantization matrix for each coding mode, and uses a different quantization matrix for each coding mode. FIGS. 2 and 3 show quantization matrices used by the quantizer 105 in the intra coding mode and in the inter coding mode, respectively.

Each of FIGS. 2 and 3 shows a quantization matrix in the initial state. These quantization matrices can be set arbitrarily.

In particular, the quantizer 105 quantizes the DCT coefficients using the following expression (1).

$$QDCT(i,j)=\text{Round}(DCT(i,j)/8) \ i=0, j=0, \text{intra}$$

$$QDCT(i,j)=\text{Round}(DCT(i,j)/(W(i,j) \cdot qscale/16)) \text{ otherwise} \quad (1)$$

where DCT(i,j)(i,j=0, 1, ..., 7) are DCT coefficients, QDCT(i,j) are DCT coefficients after quantization, W(i,j) denotes a quantization matrix, qscale denotes a quantization coefficient and Round(x) is a function that indicates rounding process for obtaining an integer nearest to x. The quantization coefficient is adjustable from outside to conduct coding at a suitable bit rate.

The quantizer 105 calculates residues using the following expression (2).

$$RES(i,j)=DCT(i,j)-8 \cdot QDCT(i,j) \ i=0, j=0, \text{intra},$$

$$RES(i,j)=DCT(i,j)-(qscale \cdot w(i,j)/16) \cdot QDCT(i,j) \text{ otherwise} \quad (2)$$

where RES(i,j) denotes a residue generated by quantization.

The cost calculator 108 calculates a predictive coded quantity, which is a predicted value of the coded quantity in each coding mode, based on the quantization result stored in the quantization result memory 106. The cost calculator 108 also calculates a predictive coding distortion, which is a predicted value of coding distortion in each coding mode, based on the residue stored in the residue memory 107.

The cost calculator 108 retains a coded quantity prediction expression used to calculate a predicted value of the coded quantity and a coding distortion prediction expression used to calculate a predicted value of coding distortion. The cost calculator 108 calculates predictive coded quantity using the coded quantity prediction expression, and calculates the predictive coding distortion using the coding distortion prediction expression.

The cost calculator 108 calculates a coding cost based on a linear combination (D+λR) of the predictive coded quantity and predictive coding distortion obtained as described above. The calculation of the coding cost is conducted for all coding modes that can be set.

A coded quantity R, which would be generated at the coding of a predetermined macro block, is calculated by using a coded quantity prediction expression (3).

$$R = C_{header} + C_{rate} + \alpha_{rate} \sum_{i,j} 1 - u(|QDCT(ij)|), \quad (3)$$

where $C_{rate}$ and $\alpha_{rate}$ are values that are constant over the picture coding period, $C_{header}$ denotes a coded quantity other than the quantity of the DCT coefficients, which are required for the coding in the pertinent mode and the function u(x) means step function that is defined as $$u(x) = \begin{cases} 0 & \text{if } x < 0 \\ 1 & \text{if } x \geq 0. \end{cases}$$

The "coded quantity other than the quantity of the DCT coefficients" means mode information, the quantization scale, and the coded quantity needed to code the motion vector.

Coding distortion D is calculated by using a coding distortion expression (4).

$$D = \sum_{i,j} RES(i, j)^2 \quad (4)$$

In the calculation of the predictive coded quantity and the calculation of the coding distortion, information such as the mode information, the quantization scale, and the motion vector is necessary. The cost calculator 108 obtains the information of these kinds by using a method such as table lookup.

Here, the macro block is a unit of an image block and includes 16 by 16 pixels. In a typical 4:2:0 color image, one macro block includes six blocks. The coding apparatus 100 conducts coding on the macro block basis.

Figure 4:
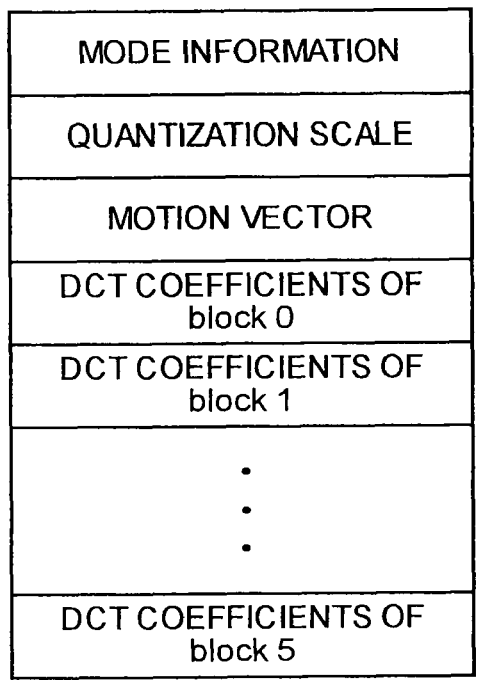
FIG. 4 is a diagram that depicts an example of a typical grammar configuration of a bit stream of a macro block in MPEG.

FIG. 4 shows a typical example of syntax configuration of a bit stream of a macro block in MPEG. The bit stream in the macro block includes information such as mode information concerning the coding mode, the quantization scale, the motion vector and DCT coefficients of respective blocks.

FIG. 4 shows only an exemplary configuration of bit stream and the actual syntax varies depending on the coding mode and the subject image. For example, in the intra coding, the bit stream may not have the motion vector information. If the quantization scale is equal to that in the immediately preceding coded macro block, the bit stream in the pertinent macro block may not have the information of the quantization scale. In the inter coding, a bit stream in a block in which all DCT coefficients are zero may not have information concerning the DCT coefficients.

The mode selector 109 selects a minimum coding cost from the coding costs calculated for the respective coding modes by the cost calculator, and selects a coding mode corresponding to the minimum cost. In addition, the mode selector 109 extracts a quantization result in the selected coding mode from the quantization result memory 106, and sends the quantization result to the VLC 111 and the inverse quantizer 112.

The VLC 111 conducts variable length coding (VLC) using the received quantization result. The VLC 111 sends data obtained by the variable length coding to the inverse quantizer 112. The VLC 111 sends the actual number of bits generated as a result of the coding, i.e., the actually coded quantity, to the cost calculator 108.

The inverse quantizer 112 and the IDCT 113 conduct inverse quantization and inverse discrete cosine transform on data acquired from the selector 110, respectively. As a result of the processing, a locally decoded residual image is generated in the inter coding mode, whereas a locally decoded image is generated in the intra coding mode.

On the other hand, the selector 116 selects an image subjected to the motion compensation in the mode selected by the mode selector 109, and transmits the motion-compensated image to the adder 117.

The adder 117 acquires the residual image or the decoded image from the IDCT 113. The adder 117 also acquires the image after the motion compensation in the motion detector and motion compensator 102 from the selector 116 in the inter coding mode. The adder 117 adds the residual image and the motion-compensated image to generate a locally decode image in the case of inter coding mode.

The cost calculator 108 retains the actually coded quantity acquired from the VLC 111 and Σ(1−u(|QDCT|)) so as to associate them with each other.

Upon completion of coding of one frame, the cost calculator 108 updates the function (expression (3)) to be used to calculate the predictive coded quantity R based on the relationship between the number of generated bits and Σ(1−u(|QDCT|)) retained in association earlier.

Figure 5:
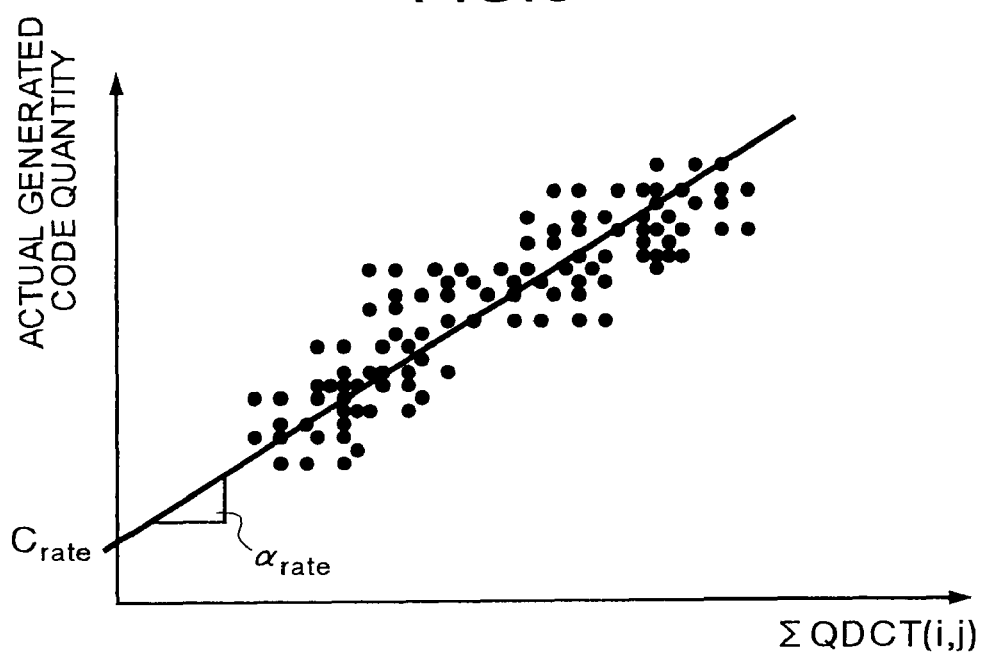
FIG. 5 is a graph that depicts a relationship between an actually coded quantity and $\Sigma(|QDCT|)$.

FIG. 5 is a graph showing a relationship between the actually coded quantity and Σ(1−u(|QDCT|)). Upon completion of coding of one frame, statistical data indicating the relationship between the actually coded quantity and Σ(1−u(|QDCT|)) are obtained from the result of the coding. Values of Crate and αrate in the expression (3) can be determined based on this relationship. At this time, for example, the least square method may be used.

The scene change detector 118 always monitors the input image and detects a scene change. Upon detecting a scene change, the scene change detector 118 gives a notice to that effect to the cost calculator 108. If the scene change detector 118 detects a scene change, the cost calculator 108 erases all of the relationship between the actually coded quantity and Σ(1−u(|QDCT|)) previously retained. In addition, the cost calculator 108 resets the prediction coefficients Crate and αrate to the initial values. In other words, the coded quantity prediction expression is initialized.

Figure 6:
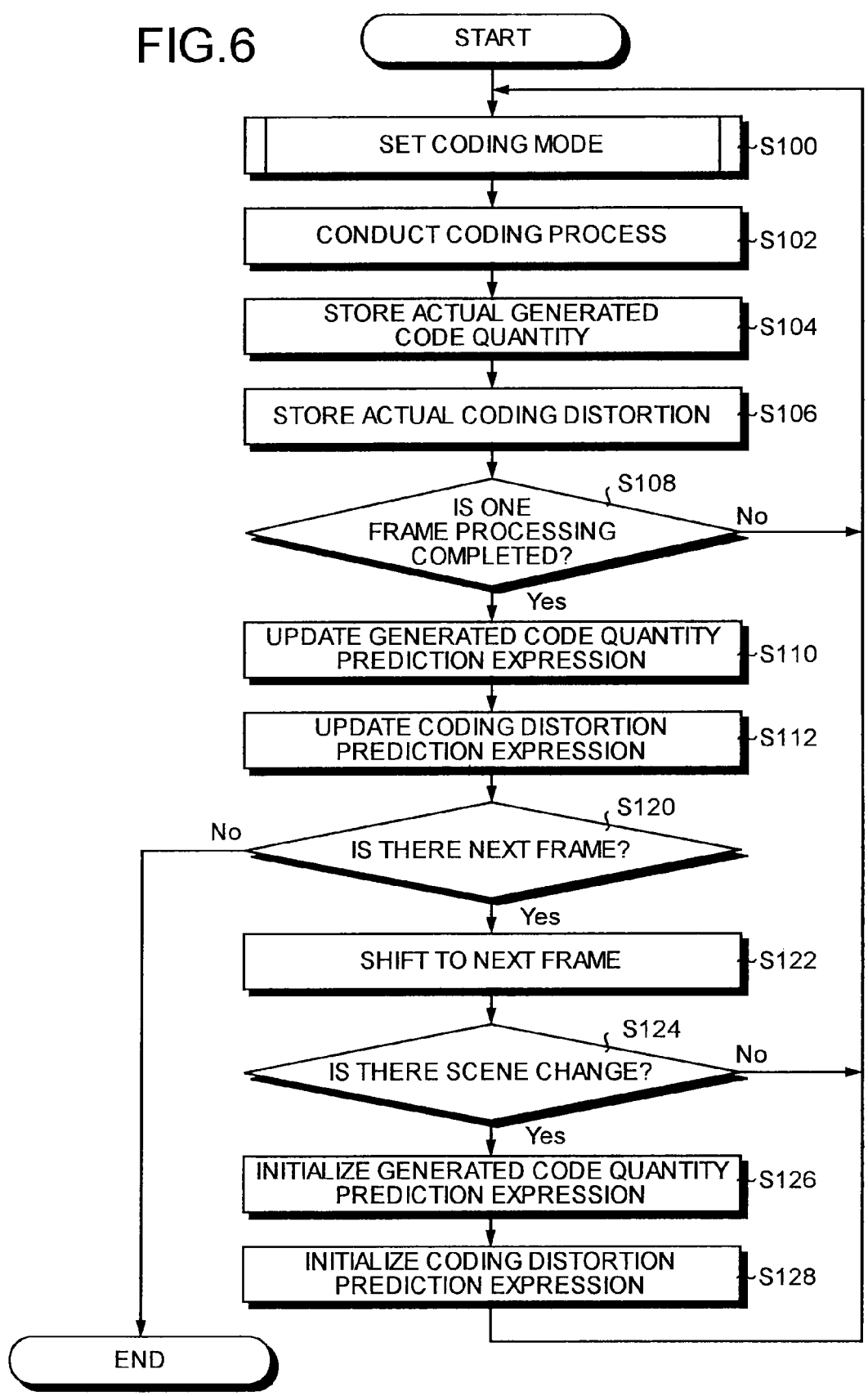
FIG. 6 is a flow chart that depicts a coding mode selection process that is a feature of a coding apparatus 100 according to the embodiment.

FIG. 6 is a flow chart that depicts a coding mode selection process that is a feature of the coding apparatus 100 according to the embodiment.

The coding apparatus 100 conducts a coding mode setting process on the dynamic image on a macro block-basis (step S100). The coding apparatus 100 conducts coding process according to the selected coding mode (step S102). The coding apparatus 100 then retains the actually coded quantity obtained by coding in the cost calculator 108 (step S104). Process at the steps S100 to S106 is conducted for each frame.

In this way, the coding mode setting is conducted on each macro block. Therefore, coding process can be conducted on each macro block in a suitable mode.

If the process at the steps S100 to S103 is completed for one frame (Yes at step S108), the cost calculator 108 updates the coded quantity prediction expression for the corresponding coding mode based on the statistical data of the actually coded quantity stored until then (step S110).

Each time the coding process for one frame is completed, the coded quantity prediction expression is updated based on the actual measured values obtained for one frame. In other words, actual measured values are fed back to the prediction expressions. Therefore, the cost calculator 108 can calculate the predictive coded quantity and the predictive coding distortion that are closer to the actual measured values. In other words, the coding cost that is closer to the actual measured values can be calculated, and a more suitable coding mode selection can be conducted.

The update of the prediction expressions in the intra coding mode is conducted for every frame as explained with reference to the flow chart. However, the update of the prediction expressions in the inter coding mode is not conducted in an I-picture for which the inter coding mode is not present. The update of the prediction expressions concerning the backward inter coding is not conducted in a P-picture for which the backward inter coding mode is not present.

The process is shifted to the next frame (Yes at step S120, step S122). If the scene change detector 118 detects a scene change, the coded quantity prediction expression updated at the step S110 is initialized (Yes at step S124). The coding distortion prediction expression updated at the step S112 is initialized (step S128).

If the process heretofore explained is conducted on all frames of the dynamic image (No at the step S120), the coding is completed.

If there is a scene change, a feature is often different in the current image from the previous image. Therefore, it is expected that a tendency different from that in the previous statistical data is exhibited. In the coding apparatus 100 according to the embodiment, therefore, the coded quantity prediction expression and the coding distortion prediction expression are initialized when a scene change is detected.

Thus, even if there is a scene change, the predictive coded quantity and predictive coding distortion that are close to the actual measured values can be calculated. Therefore, coding process can be conducted in a more suitable coding mode.

Figure 7:
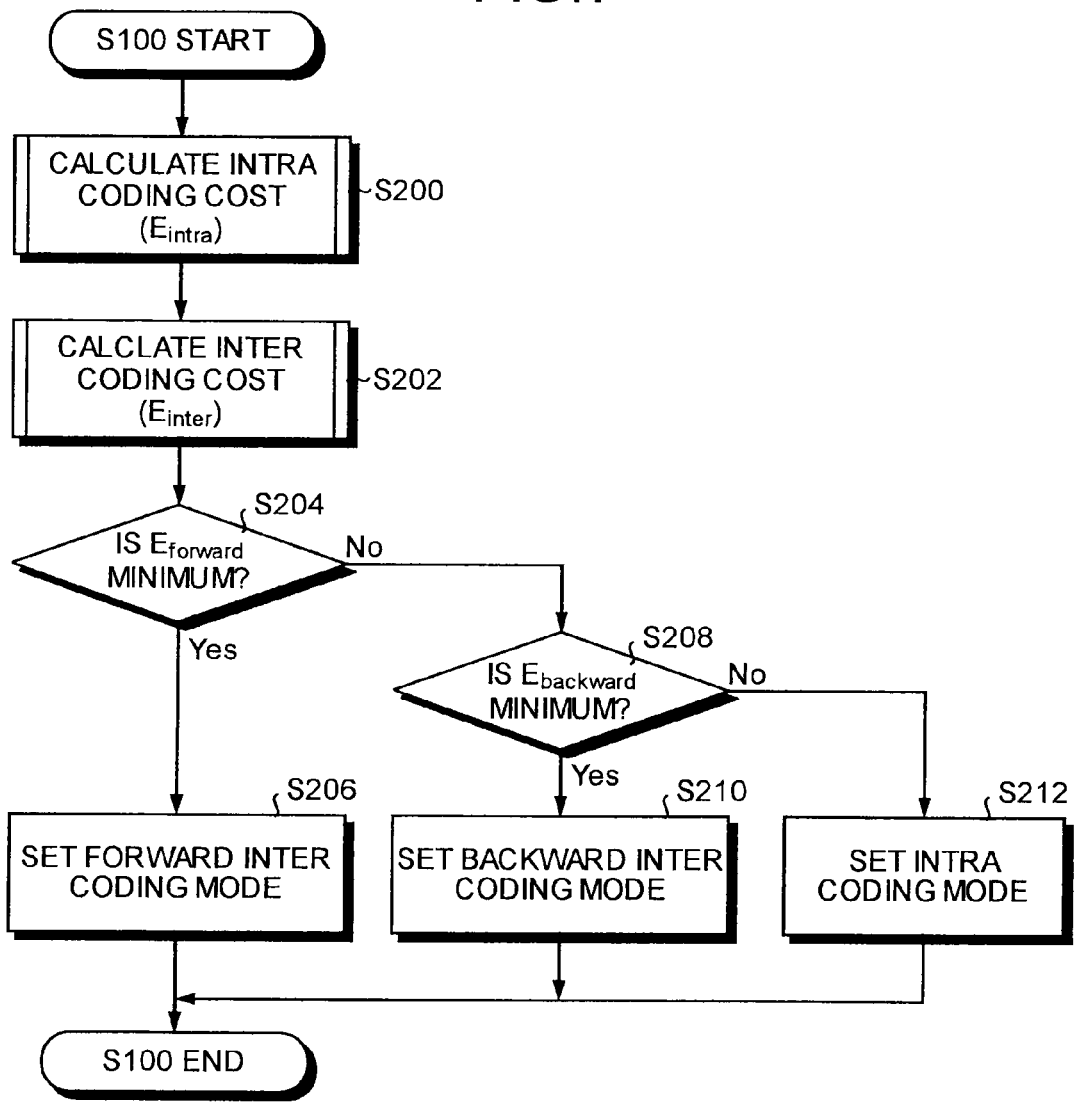
FIG. 7 is a flow chart that depicts in detail a process conducted at a coding mode setting step (step S100), which is explained with reference to FIG. 6.

FIG. 7 is a flow chart in detail of a process conducted at the coding mode setting step (step S100) explained with reference to FIG. 6.

At the coding mode setting step, the coding cost in the intra coding is calculated (step S200). The coding cost in the forward inter coding and the coding cost in the backward inter coding are calculated (step S202).

The predictive coded quantity in the intra coding and the predictive coded quantities in the inter coding are denoted by Rintra and Rforward, and Rbackward, respectively. The coding distortion in the intra coding is denoted by Dintra. The coding distortion in the forward and backward inter coding are denoted by Dforward and Dbackward, respectively. Here, the cost functions Eintra, Eforward and Ebackward in respective modes are denoted by the following expression (5)

$$E_{intra} = D_{intra} + \lambda R_{intra}$$

$$E_{forward} = D_{forward} + \lambda R_{forward}$$

$$E_{backward} = D_{backward} + \lambda R_{backward} \quad (5)$$

where $\lambda$ is a constant.

The coding costs in the coding modes are compared with each other (step S204). If the coding cost in the forward inter coding is lower than the coding costs in other modes (Yes at the step S204), the coding mode is set to the forward inter coding mode (step S206). If the coding cost in the backward inter coding is lower than the coding costs in other modes (Yes at the step S208), the coding mode is set to the backward inter coding mode (step S210). If the coding cost in the intra coding is lower than the coding costs in other modes (No at the step S208), the coding mode is set to the intra coding mode (step S212).

Thus, the coding apparatus 100 according to the embodiment selects the coding mode, that would minimize the coding cost, thereby optimizing the coding process for each subject frame.

Figure 8:
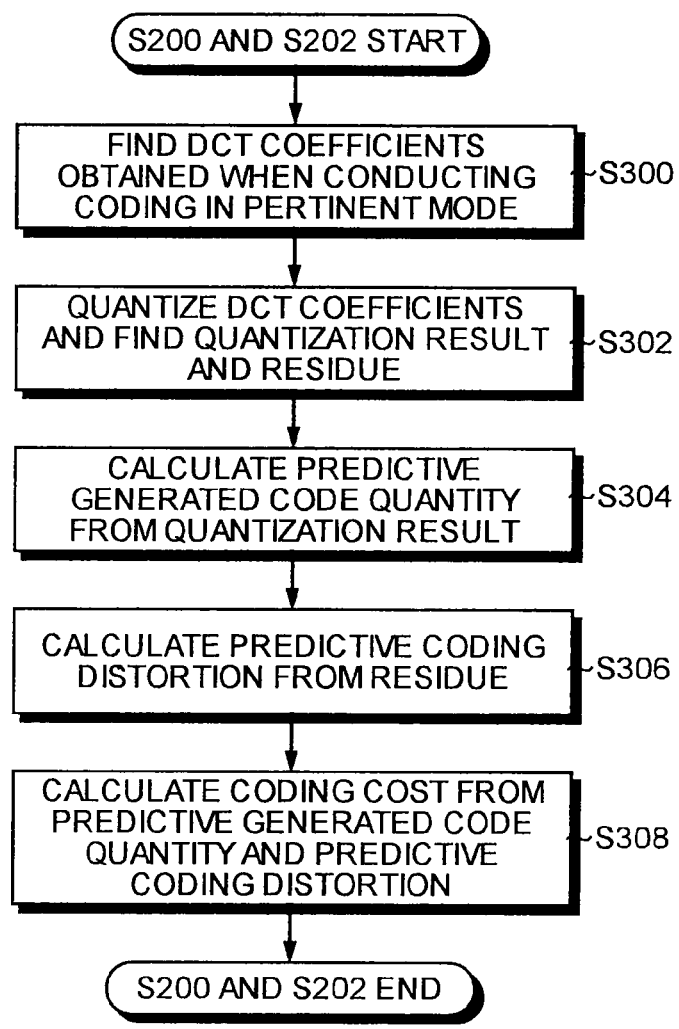
FIG. 8 is a flow chart that depicts in detail a process conducted at a coding cost calculation step (steps S200 and S202) shown in FIG. 7.

FIG. 8 is a flow chart in detail of a process conducted at the coding cost calculation step (steps S200 and S202) shown in FIG. 7.

The DCT 104 calculates DCT coefficients when conducting coding in the pertinent coding mode (step S300). The quantitizer 105 quantizes the calculated DCT coefficients and calculates the quantization result and residue (step S302). The cost calculator 108 calculates the predictive coded quantity from the quantization result retained in the residue memory 107 (step S304), and calculates the coding distortion from the coding distortion retained in the cost calculator 108 (step S306). Based on the calculated predictive coded quantity and coding distortion, the coding cost is calculated. (step S308).

Thus, the coding cost can be calculated in each coding mode without actually conducting inverse coding. Therefore, the processing cost can be decreased.

A coding mode selection based on the coding cost, called "rate distortion optimization" is adopted in a reference encoder in MPFG-4 Part 10 (AVC)|H. 264. In the reference encoder, however, it is represented as a function of quantization coefficients. In addition, in conventional methods, all values of the coded quantity and the coding distortion are actual measured values.

In order to obtain actual measured values, the coding process must be actually conducted in respective coding modes. This results in the larger calculation quantity and the lower processing efficiency.

In particular, when the mode decision is conducted based on the rate distortion optimization, the processing time may become several times longer than the time required for the mode decision which does not employ the rate distortion optimization. Modes in which one macro block is coded in the MPEG-2 are classified broadly into two kinds: intra and inter. The inter coding is further classified into six kinds: forward field motion compensation, forward frame motion compensation, bidirectional field motion compensation, bidirectional frame motion compensation, backward field motion compensation, and backward frame motion compensation.

If the mode decision based on the rate distortion optimization is introduced for all of these modes, the processing time becomes seven-folds. In the MPEG-4 Part 10 (AVC)|H.264, modes are greatly expanded in both the intra coding and the inter coding, which may result, at the introduction of the rate distortion optimization, in more than several ten times increase in calculation cost.

For the processing of such enormous quantity in real time, it may be necessary to provide a processor with more than several times higher computation capability or an LSI with more than several times larger circuit scale than conventional devices. Hence, the increase in calculation cost poses a serious problem.

On the other hand, the coding apparatus 100 according to the present embodiment calculates the coding cost based on the predictive coded quantity and the coding distortion calculated by using the prediction expressions without actually conducting the coding process as described above. Therefore, the coding mode can be determined suitably without the increase in computation quantity due to additional coding.

Figure 9:
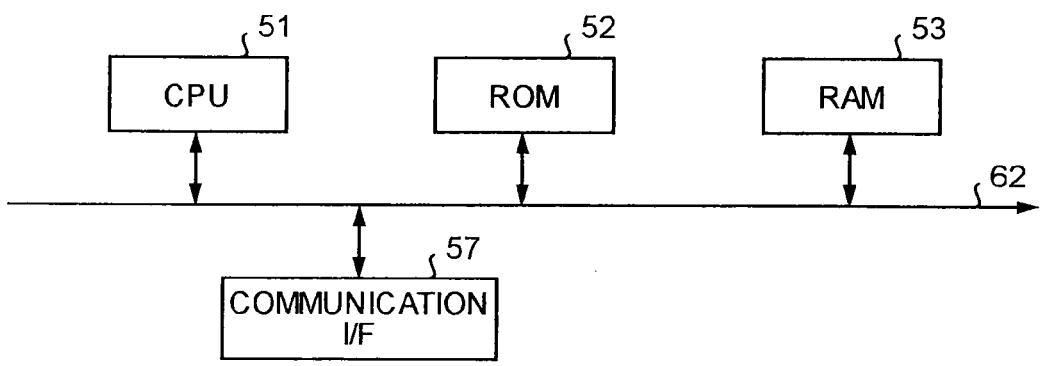
FIG. 9 is a diagram that depicts a hardware configuration of a coding apparatus 100 according to the embodiment.

FIG. 9 is a diagram that depicts a hardware configuration of the coding apparatus 100 according to the embodiment. As for the hardware configuration, the coding apparatus 100 includes a ROM 52 in which a coding program for the execution of coding process in the coding apparatus 100 is stored, a CPU 51 which controls components in the coding apparatus 100 based on the program in the ROM 52 and executes buffering time alteration process, a RAM 53 in which a work area is formed and various data required to control the coding apparatus 100 are stored, a communication interface (I/F) 57 which is connected to a network to conduct communication, and a bus 62 which is used to connect the components.

The coding program to be conducted as described above in the coding apparatus 100 may be recorded and provided on a computer readable recording medium, such as a CD-ROM, a Floppy (Registered Trademark) disk (FD) or a DVD in an installable or executable file format.

When provided in a form recorded in a computer readable recording medium, the coding program is read out from the recording medium in the coding apparatus 100, executed and thereby loaded onto a main storage. Respective components described above with reference to the software configuration are generated on the main storage.

The coding program according to the embodiment may be stored on a computer connected to a network such as the Internet, and downloaded via the network.

Heretofore, the present invention is explained with reference to the embodiment. However, various changes or improvements can be applied to the embodiment.

As heretofore explained, the image coding apparatus according to the present invention is useful to image coding process using a plurality of coding modes. In particular, the image coding apparatus according to the present invention is suitable for image coding process in which a suitable coding mode is selected.

According to the embodiment, the coding apparatus 100 can calculate the coding cost without actually conducting the coding process. In other words, selection of a coding mode based on the coding cost can be conducted without the actual coding processing. Thus, the embodiment may provide an advantageous image coding which is conducted with little computation quantity while maintaining the image quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image coding method for dividing an image into a plurality of blocks to conduct coding on block basis, comprising:

conducting frequency transform and quantization on the block in a predetermined manner for a plurality of coding modes, each mode having a different coding process;

calculating a predictive coded quantity in a coding mode using a result of the quantization conducted by the conducting step;

calculating a coding cost in each coding mode using the predictive coded quantity calculated by the first calculating step;

selecting a minimum coding cost, which is minimum among the coding costs calculated by the second calculating step, for respective coding modes;

conducting coding on the blocks in a coding mode associated with the minimum coding cost selected by the selecting step;

retaining a plurality of coded quantity prediction expressions, each in association with a coding mode, to be used by the first calculating step to calculate the predictive coded quantity; and correcting the coded quantity prediction expressions retained in association with the coding modes by the retaining step, based on an actual coded quantity actually generated when the conducting step conducts coding in a predetermined coding mode, wherein the first calculating step calculates the predictive coded quantity using a coded quantity prediction expression retained in the retaining step.

2. An image coding method for dividing an image into a plurality of blocks to conduct coding on block basis, comprising:

conducting frequency transform and quantization on the block in a predetermined manner for a plurality of coding modes, each mode having a different coding process;

calculating a predictive coded quantity in a coding mode using a result of the quantization conducted by the conducting step;

calculating a coding cost in each coding mode using the predictive coded quantity calculated by the first calculating step;

selecting a minimum coding cost, which is minimum among the coding costs calculated by the second calculation step, for respective coding modes;

conducting coding on the blocks in a coding mode associated with the minimum coding cost selected by the selecting step;

retaining a plurality of coded quantity prediction expressions, each in association with a coding mode, to be used by the first calculating step to calculate the predictive coded quantity; and correcting the coded quantity prediction expressions retained in association with the coding modes by the retaining step, based on an actual coded quantity actually generated when the conducting step conducts coding in a predetermined coding mode, detecting a scene change in a frame to be processed; and initializing the coded quantity prediction expression corrected by the correction step, when the detecting step has detected the scene change, wherein the first calculating step calculates the predictive coded quantity using a coded quantity prediction expression retained in the retaining step and when the initializing step has initialized the coded quantity prediction expression, the first calculating step calculates the predictive coded quantity using the initialized coded quantity prediction expression.

* * * * *